US009228911B1

(12) United States Patent
Meyers (10) Patent No.: US 9,228,911 B1
(45) Date of Patent: Jan. 5, 2016

(54) METHOD AND APPARATUS FOR SMART E-STRAPS

(75) Inventor: Richard C. Meyers, Longboat Key, FL (US)

(73) Assignee: GlobalTrak, LLC, Sterling, VA (US)

( * ) Notice: Subject to any disclaimer, the term of this patent is extended or adjusted under 35 U.S.C. 154(b) by 482 days.

(21) Appl. No.: 13/461,724

(22) Filed: May 1, 2012

Related U.S. Application Data

(60) Provisional application No. 61/481,230, filed on May 1, 2011.

(51) Int. Cl.
*G08B 23/00* (2006.01)
*G01L 5/06* (2006.01)
*G01L 5/10* (2006.01)
*G08G 1/00* (2006.01)

(52) U.S. Cl.
CPC . *G01L 5/06* (2013.01); *G01L 5/103* (2013.01); *G08G 1/00* (2013.01)

(58) Field of Classification Search
CPC ............. G01L 5/06; G01L 5/103; G01L 1/00; B60I 7/0861
USPC ......... 340/531, 539.13, 539.26, 568.1, 686.1, 340/8.1

See application file for complete search history.

(56) References Cited

U.S. PATENT DOCUMENTS 7,019,640 B2 * 3/2006 Canich et al. ................. 340/531
2008/0297346 A1 * 12/2008 Brackmann et al. ....... 340/572.1

FOREIGN PATENT DOCUMENTS

GB                2491182 A2 * 1/2006 ................ B60P 7/08

* cited by examiner

*Primary Examiner* — Daryl Pope (57) ABSTRACT

The present invention provides a smart monitoring system incorporating various forms of hardware used to secure the tie-down straps of ULDs, pallets, or shipping containers. More specifically, the present invention provides a smart electronically enhanced strap for a container monitoring and security device which is integrated into the housing of the hardware of a tie down strap webbing. Using this system, discrete sensors housed in the ratcheting mechanism, the hook, the winch or the load bar that are attached to latching straps are able to actively monitor a securely loaded ULD, pallet or container.

12 Claims, 7 Drawing Sheets

METHOD AND APPARATUS FOR SMART E-STRAPS

BACKGROUND AND FIELD OF THE INVENTION

1. Field of the Present Invention

The present invention relates generally to container security and, more particularly, to a container security system in which GPS transponders, Zigbee wireless sensors and compression load sensors are incorporated with pallets to ensure secure freight delivery.

2. Background of the Invention

Aircraft loads can consist of containers, pallets, or a mix of unit load devices (ULD) types, depending on load requirements. With regards to pallets, a pallet and cargo net assembly becomes a serviceable unit load device only under the following conditions: (1) all cargo fits inside the allowable dimensional profiles; (2) a complete undamaged cargo net with all net-to-pallet attachments secured to the ring track completely restrains the cargo; (3) all center of gravity limits for the device (vertical, lateral and longitudinal) are met; (4) the maximum certified restraint/limit value per ULD is not exceeded; (5) the pallet and cargo net assembly is certified under NAS 3610; and (6) the distribution of the cargo conforms to the maximum allowable bearing weight.

According to the applicable standards, the strength of the cargo net must certified for the maximum gross weight of the pallet. Further, tie downs must be used as a replacement of the pallet net only for: 1) loads which could be damaged using a net (examples: automobiles, helicopters, and aircraft engines) or 2) loads which cannot be effectively restrained by the net because of mesh size (i.e., pipes, extensions).

Tie down straps (also called tie downs) are fasteners used to hold down cargo or equipment during transport. Tie down straps are essentially webbing that is outfitted with tie down hardware. This hardware allows each tie down strap to attach to the area surrounding the cargo or equipment, loop over the cargo or equipment, and/or attach to the cargo or equipment. It usually also provides a method of introducing tension to hold the item in place.

Cargo is secured to the aircraft floor using tie down equipment organic to the aircraft or provided by the local air terminal. There are many different types of hardware used to attach a tie-down strap to the ULD, pallet, or container. Some examples include: ratchet and cam-buckles, flat hooks, flat snap-hooks, grab hooks, winches and load bars.

Loads that are not loaded properly can cause significant safety hazards to the loaded product, other pallets and containers, and also to the aircraft itself. More importantly, a poorly balanced load can also affect overall flight safety. The problem with the present methods and standard procedures for loading containers and pallets is that there is a high degree of inconsistency in handler experience and knowledge. There are efforts to improve standard operating procedures and raise the consistency level between handlers through on-going training for cargo handlers. However, what is needed is a more standardized and objective measuring tool for monitoring the balance and weight of separate loads.

SUMMARY OF THE PRESENT INVENTION

The present invention provides a smart electronically enhanced strap for a container monitoring and security device which is integrated into the housing of the hardware of a tie down strap webbing. More specifically, the present invention incorporates a smart monitoring and communications system into various forms of hardware used to secure the tie-down straps of ULDs, pallets, or shipping containers. Using this system, discrete sensors housed in the ratcheting mechanism, the hook, the winch or the load bar that are attached to latching straps are able to actively monitor a securely loaded ULD, pallet or container.

In accordance with a preferred embodiment, the straps and tie downs of the present invention are linked to the container unit and are able to communicate with other devices through the use of an extended wireless network (i.e. such as Star Network or similar network configuration). According to a preferred aspect of the present invention, such a network preferably uses a communication protocol such as the Zigbee protocol based on the IEEE 802.15.4 standard for wireless personal area networks (WPANs) which is incorporated by reference herein.

Further in accordance with a preferred embodiment, such a network is preferably designed to allow for mobile or ad-hoc configurations (such as a mesh network). According to the present invention, such a system can preferably calculate the weight and dimensions of the load while communicating with existing monitoring systems already on a container, ULD or pallet. Through this process, the system may receive pertinent data pertaining to container types, sizes, nomenclature and varying tolerances. An exemplary method and apparatus for establishing a smart ULD by the same applicant has been described in detail within Provisional Application No. 61/448,026 which is hereby incorporated by reference herein.

According to a further aspect of the present invention, the enhanced straps and tie downs of the present invention (hereafter referred to as "e-straps") may be used to secure a load while at the same time extracting information from the containers to which it is attached. Further, the e-straps may compile data from within a mesh network of e-straps to determine weight and load balances. Additionally, using this system, buried or obstructed container systems may be able to communicate and gain access to a satellite or cellular link communications through a neighboring container or device.

Further, the present invention provides a method to coordinate analysis of data to improve determination of the exact location and status of an asset. This increased visibility will enable the customer to pinpoint the real time location of a single box more accurately and more efficiently than the prior art.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

For the purposes of promoting an understanding of the principles of the present invention, reference will be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM. Flash memory, battery backed-up RAM, disk drive memory, CD-ROM, DVD, and other permanent storage media. However, even volatile storage such a RAM, buffers, cache memory, and network circuits are contemplated to serve as data storage according to different embodiments of the present invention.

Figure 1:
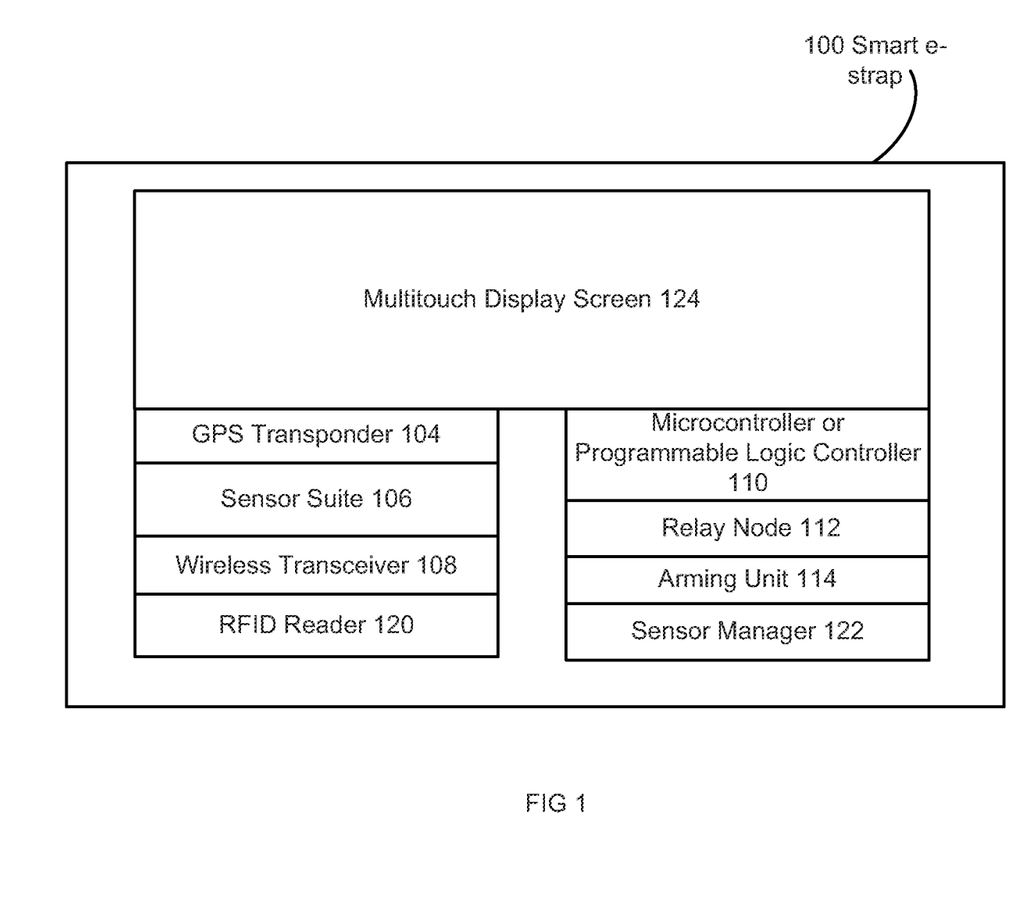
FIG. 1 shows a block diagram of a smart e-strap device in accordance with an embodiment of the present invention.

With reference now to FIG. 1, a block diagram of an exemplary smart e-strap monitoring device in accordance with an embodiment of the present invention is provided. As shown in FIG. 1, a smart e-strap monitoring device 100 according to a preferred embodiment of the present invention preferably includes: a GPS Transponder 104; an expandable sensor suite 106; a wireless transceiver 108; a Microcontroller or Programmable Logic Controller (PLC) 110; a relay node 112; an alarming unit 114; an RFID reader 120; a Sensor Manager 122 and a Multitouch input/Display Screen 124.

Preferably, the sensor manager 122 of the present invention may query all other smart sensors attached to the load, override the individual processors and coordinate the functions of all systems to respond as a single unit. Also preferably, the present invention may be capable of communication with a remote monitoring station.

Preferably, the present invention includes circuitry to continuously monitor each sensor and capture the highest amplitude signal over a determined, short time interval. Thereafter, as signals are detected, it is preferred that a sensor manager 122 is provided to sample the measured values once per programmed interval and thereafter to provide the sampled results for further processing and analysis by the processing system of the present invention. The interval can be changed by the processing system as required to gather more detailed information.

Sensors

The following sensors comprise, a preferred suite of sensors for use with the sensing system of the present invention. Preferably, each of these should be designed to be adjusted to suit particular applications. Data from these sensors is preferably processed, stored and acted upon by the processing system of the present invention as discussed in detail below. It should be understood that although preferred operating parameters for each preferred sensor described below are suggested, each sensor may of course be adjusted to suit particular applications. The key goal for each sensor is to allow a resolution of measurement sufficient to allow for noting small and sudden differences in an otherwise stable container environment that may indicate a change in load balance, load weight or evidence of tampering.

Compact Compression Load Sensor—Preferably, a compact compression load sensor may be used to measure the high capacity and low capacity of measurements in compression, pressure, force and tension.

Stress Sensor—A stress sensor is a sensor designed to detect the level of mechanical stress applied to an object.

Tension Indicator—A tension indicator is a device which signals what level of tension is applied to an object.

Fabric Bend Sensor—A fabric bend sensor is a small, lightweight versatile housing that can include multiple sensors and may be located within the monitor and/or also within the nylon threading of the strap.

GPS Transponder—Preferably, GPS Transponder 104 can determine altitude by trilateration with four or more satellites. However, in aircraft, altitude determination using autonomous GPS is not precise or accurate and may need to be superseded by the pressure altimeter. The GPS transponder 104 in the present invention may also be used to cross check positioning.

Air Pressure Sensor—Preferably, the air pressure sensor of the present invention is capable of measuring the pressure within the hold of an aircraft. An instrument such as a digital barometric altimeter may be useful for such a measurement.

RFID Reader—Preferably, the RFID reader 120 on the smart e-strap may be capable of querying all passive, semi-passive and active RFID tags on all items.

Preferably, the smart e-strap device is not limited to the above described listing of sensors, but is intended to be customized and manufactured to meet the needs of the shipper.

Figure 2:
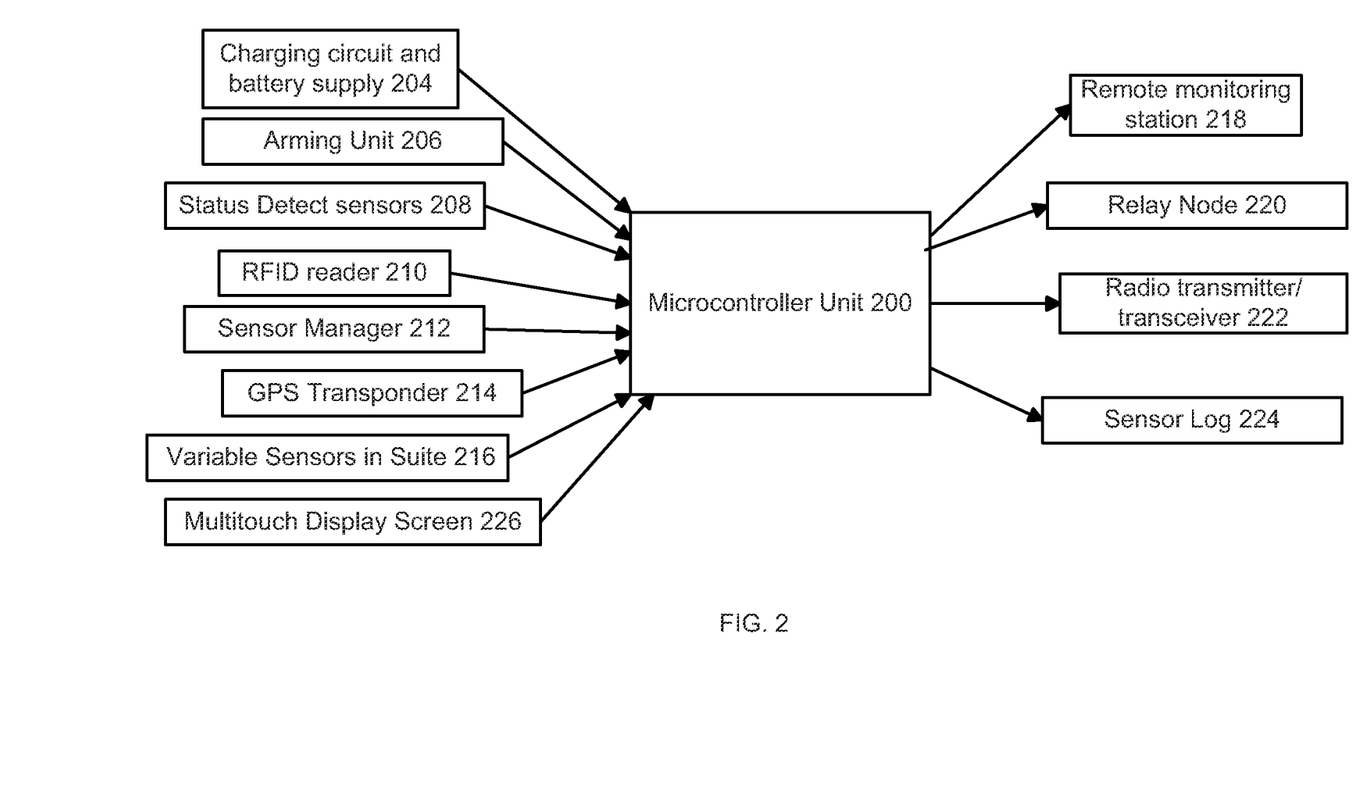
FIG. 2 shows a block diagram of the electrical wiring for a smart e-strap device in accordance with an embodiment of the present invention.

With reference now to FIG. 2, an electrical wiring diagram of a microcontroller unit according to an embodiment of the present invention will now be discussed. A controller unit 200 receives input from a charging circuit and battery cells 204, an alarming unit 206, the status detect sensors 208, a RFID reader 210, the sensor manager 212, a GPS transponder 214, variable sensors in a sensor suite 216 and a multitouch input/display screen 226. The controller 200 then accesses all the information and sends out signals to a radio transmitter/transceiver 222, a sensor log 224, a relay node 220, and a remote monitoring station 218. Data from these sensors is processed, stored, and acted upon by the controller unit 200.

Processing System

Figure 3:
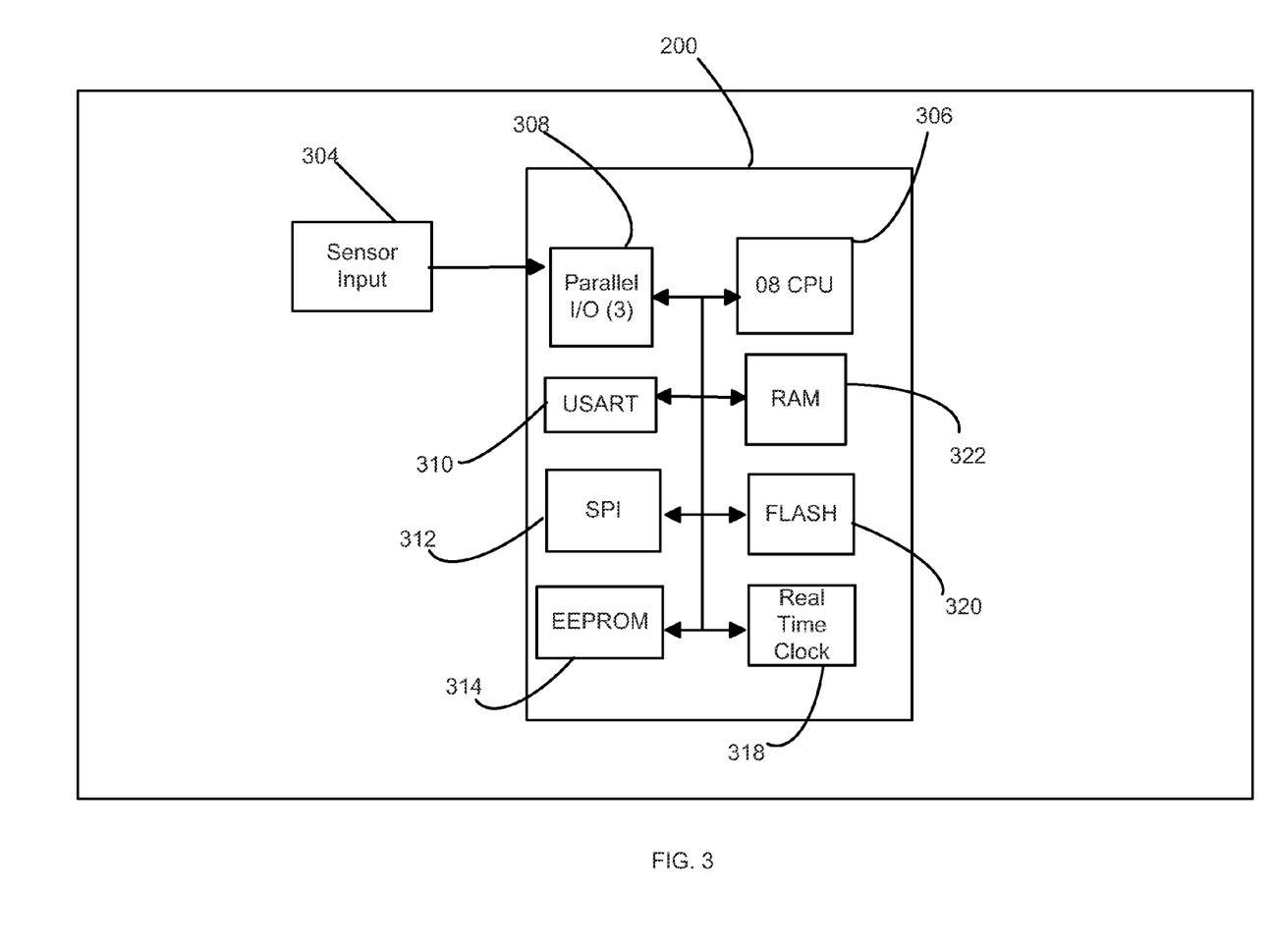
FIG. 3 shows a block diagram of a processing system in accordance with an embodiment of the present invention.

With reference now to FIG. 1 and FIG. 3, a first preferred embodiment of the processing system of the present invention will now be discussed. As shown in FIG. 3, it is preferable that control of the sensor system is maintained by an on-board controller 200. As discussed above, it is preferable that the processing system, through its on-board controller 200 compare the sequence and threshold performance of the sensors 304 in the clusters to a set of predetermined patterns and levels. Based on a series of rule sets stored in memory, the controller 200 may then operate to declare security events and initiate recording and communication actions as programmed. For instance, based on sensor input 304 regarding the measured range of acoustic frequency in the container, the controller 200 may initiate an energy conservation mode.

In operation, the controller 200 is preferably programmed to routinely scan the conditions of the sensors to ensure operability. It is further preferable that the controller 200 has access to all other subsystem managers and provides control of the sensor, communications, power, and alerting functions. To achieve this function, as shown in FIG. 1, it is preferred that the controller 200 have access to and handle all of the system logging of sensor data on a sensor log or similar medium.

As also shown in FIG. 1, it is further preferred that the controller 200 will also control any alarms 114 which may be placed on a secured load. Such alarms may include lights, sirens or other indicators such as a prerecorded message to indicate an unauthorized event.

Figure 4:
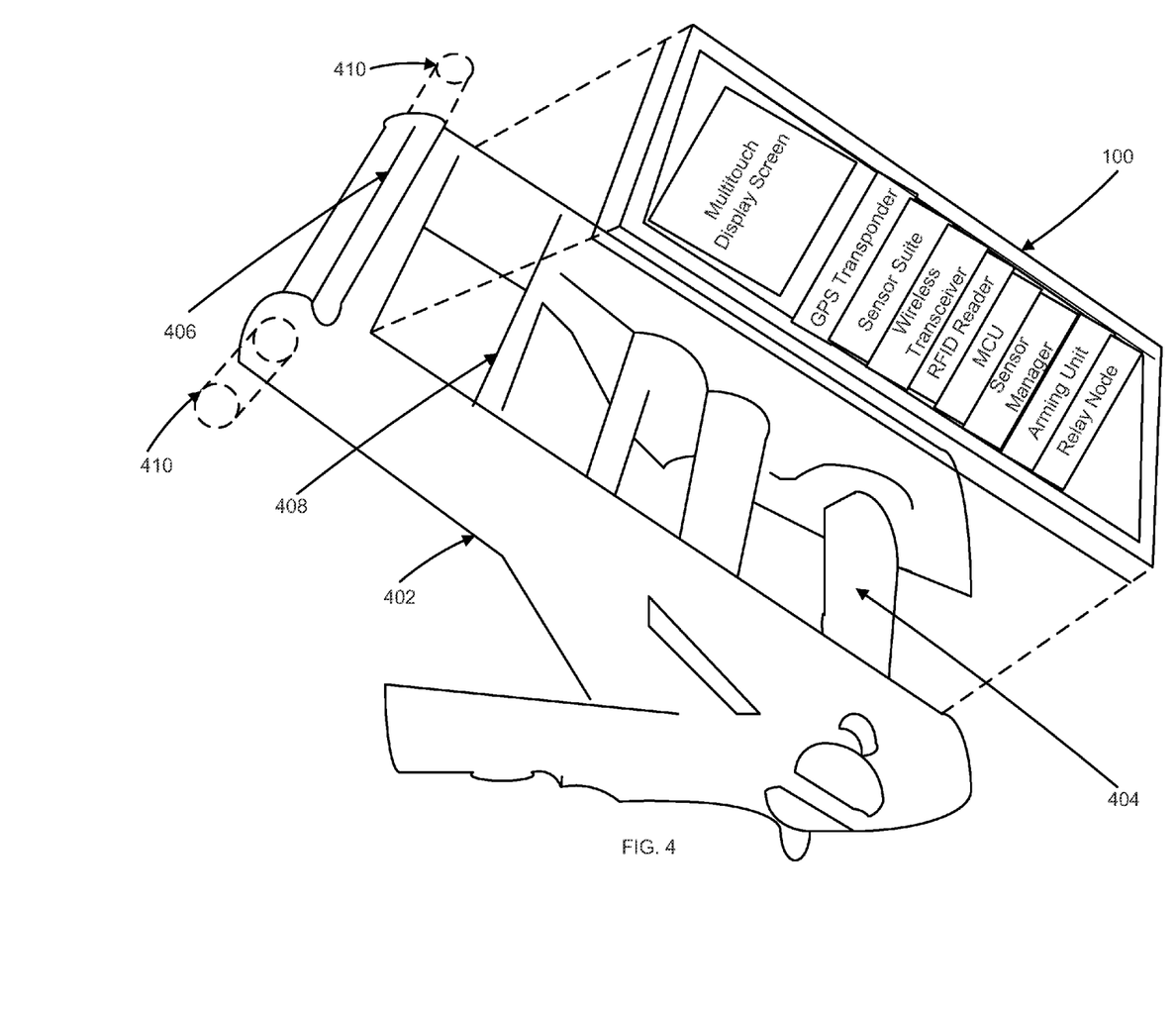
FIG. 4 shows an isometric view of a smart e-strap device in accordance with an embodiment of the present invention.

With reference now to FIG. 4, an isometric view of an exemplary smart e-strap device in accordance with an embodiment of the present invention will now be discussed. As shown in FIG. 4, the smart e-strap 100 is attached to a ratcheting mechanism 402 which includes a drum 404, a crank handle 406 and center latch 408. The end of a tie down strap is inserted into the horizontal slot of the drum 404 and by raising and lowering the crank handle 406 the strap will be tightly coiled. The gears on each end of the drum will catch each time the crank handle 406 is pumped securing the tie down strap and removing any slack from the strap while tightening the strap. The center latch 408 releases the gears when loosing the tie down strap. Preferably, according to one embodiment of the present invention, the smart e-strap device 100 may be manufactured as part of the ratcheting mechanism. In this embodiment all e-strap sensors may be housed in one unit. Alternatively, some of the sensors may be located in other parts of the ratcheting mechanism, for example, the compression sensors, tension sensors and/or the stress sensors may be located at the tension or stress points in the mechanism of the ratcheting hardware, i.e. within the drum.

The housing of the e-strap device may be manufactured from the same durable materials used to create the ratcheting mechanism such as stainless steel, steel, brass or some other light weight and durable alloy as known in the art. Alternatively, the housing of the e-strap device may be manufactured from materials that are different from the actual body of the ratcheting mechanism as the parts of the e-strap device will not be involved in the winching mechanisms or moving parts of the ratcheting hardware. As also shown in FIG. 4, an extension to the crank handle 410 may allow greater ease of use.

The smart e-strap device 100 may also be manufactured to fit any type of tie down strap hardware such as but not limited to ratchets, cam buckles, flat hooks, grab hooks winches and load bars. These various types of hardware may be attached to various types of container straps for example, but not limited to, heavy duty ratcheting tie downs, latching belts, cargo straps or trucking straps.

Using its MCU sensor suite, the smart e-strap device 100 preferably calculates the weight of a single load, senses and indicates when straps are in balance, senses tension, compression, keeps preprogrammed time stamped flash memory of conditions at predetermined intervals, detects tampering, triggers alarms and reports data to the a remote monitoring station for back end analysis.

Figure 5:
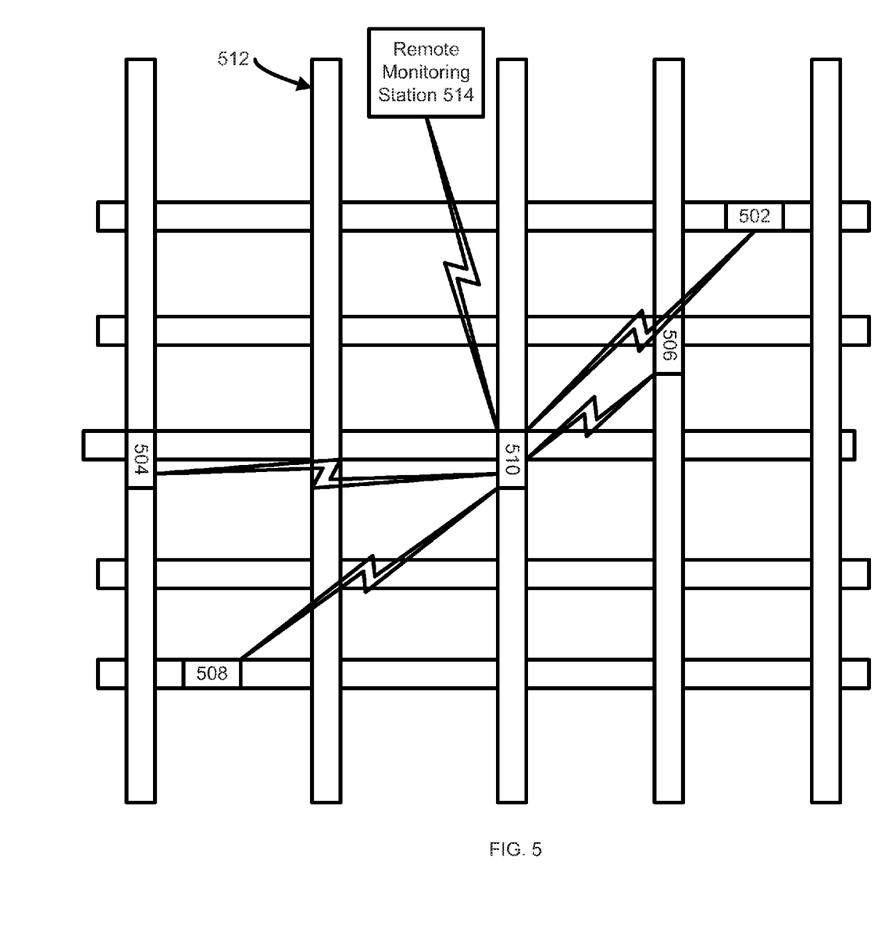
FIG. 5 shows a functional configuration of a system of networked e-straps in accordance with an embodiment of the present invention.

With reference now to FIG. 5, a further aspect of the present invention will now be discussed. As shown in FIG. 5, a top view of five latching belts 512, four peripherally located e-strap ratcheting mechanisms 502, 504, 506, 508, and one centrally located e-strap ratcheting device 510 securing a loaded pallet is provided. As further shown, a remote monitoring station 514 is provided. Preferably the central e-strap device 510 is functioning as the hub as the five e-strap devices form a star network. In this configuration, the devices may select the most centrally located e-strap unit 510 to coordinate communication with the RMS 514.

Figure 6:
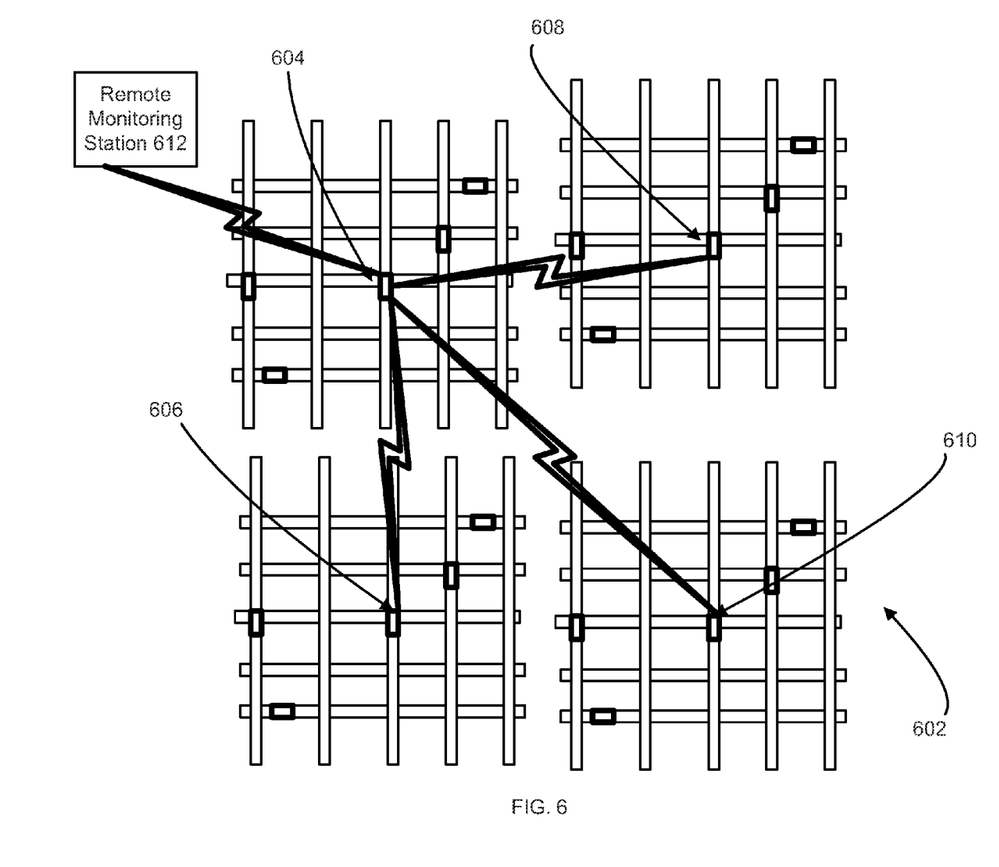
FIG. 6. shows a functional configuration of a mesh network of cargo pallets in accordance with an embodiment of the present invention.

With reference now to FIG. 6, a further aspect of the present invention will now be discussed. As shown in FIG. 6, a mesh network architecture 602 and a remote monitoring station 612 is provided. The mesh network as shown comprises wireless nodes which are the centrally located e-strap devices serving as hubs 604, 606, 608, 610 and which are able to wirelessly connecting to each of the other nodes in the network. Preferably, the hub of each loaded pallet will communicate with one another and with the remote monitoring station 612 responsible for monitoring the carrier vehicle. Each e-strap hub acting as a single node in the mesh network 602 preferably will be configured to communicate with any other e-strap hub unit. Further, the e-strap hub monitoring devices are preferably positioned to detect and report any conditions outside acceptable parameters. In addition, preferably all sensors can be pre-programmed to take measurements, time-stamp and store data, and alert remote monitoring stations to conditions outside acceptable parameters given the load data. According to a further aspect of the present invention, the mesh network will communicate and report to the carrier vehicle's processing systems and/or with a carrier vehicle's fleet network.

Figure 7:
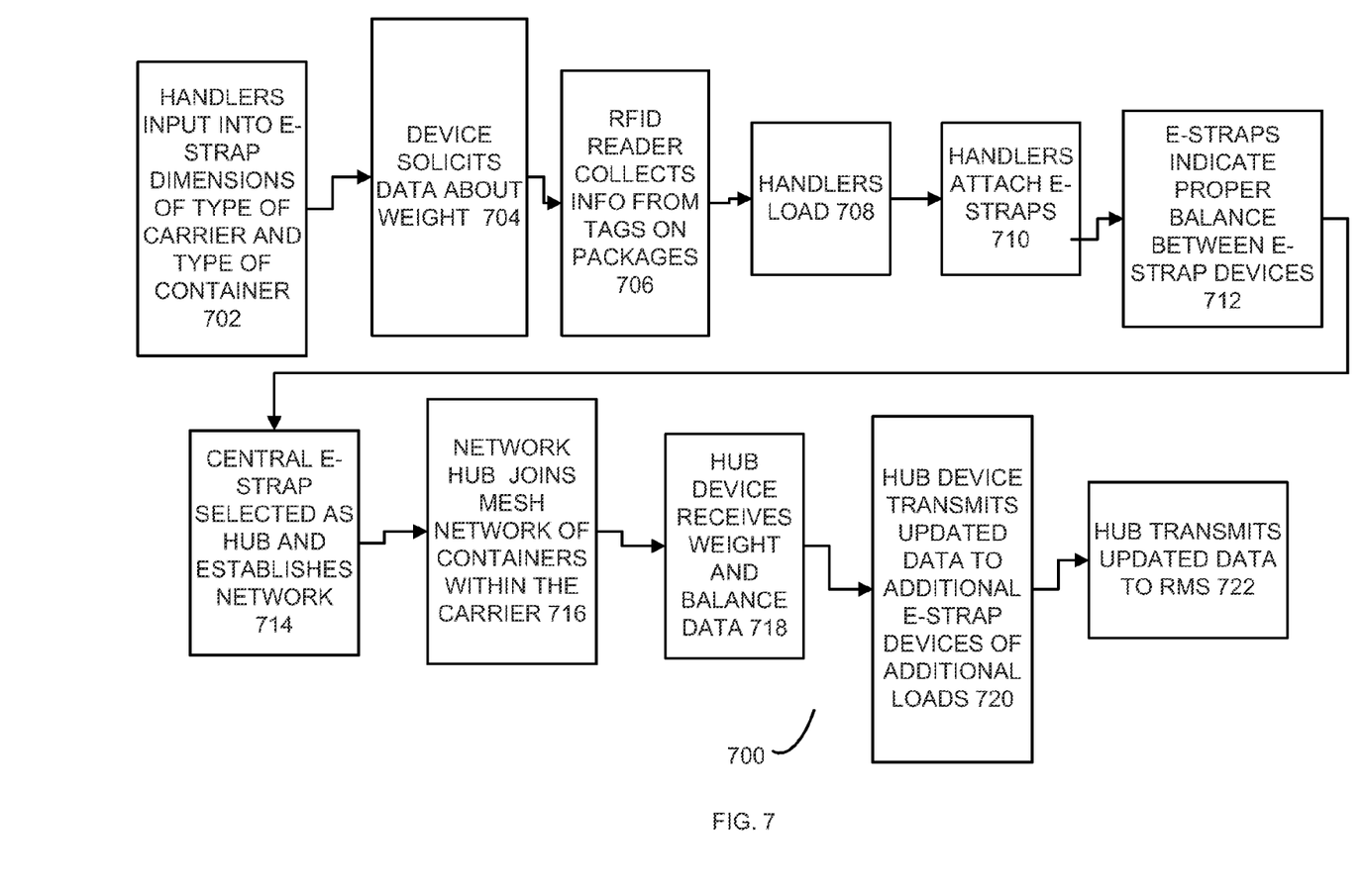
FIG. 7 shows a block diagram of a method of employing a smart e-strap device in accordance with an embodiment of the present invention.

With reference now to FIG. 7, a preferred method 700 of employing a smart e-strap device in accordance with an embodiment of the present invention will now be discussed. As shown in FIG. 7, as a first step, a handler inputs the vehicle nomenclature and specifies the type container, pallet or ULD carrier on which the load will be stacked and packed 702. Preferably, when there is at least one secure load loaded inside the carrier, the smart e-strap automatically solicits information from previous loads 704. Next, the RFID reader of the smart e-strap device will preferably collect information from RFID tags attached to the packages as they are ready to be loaded and then calculate the values indicating when the max load has been reached 706. After handlers properly load the container 708 and receive notification that the max load has been reached, they will attach all netting, straps, tiedowns and e-straps 710. Preferably, there will be at least three e-strap devices per load. In a preferred embodiment of the present invention, the percentage of e-straps forming a net over a single load may range from 1 percent to 10 percent of the straps used. Further, the e-straps connected to the load will preferably select the most centrally located e-strap device to be the hub and establish a star network in which all other e-strap devices are end-points in relation to the central hub of a single load 714. Once established, the hub may request to join the mesh network of hub devices of containers within a carrier vehicle 716. The hub device once linked into the mesh network may then receive information about the composite weight and how the overall weight has been distributed 718. When the next loaded container solicits information about the composite weight and balance, the hub device will preferably transmit updated data to the next designated hub 720. The hub device may also report status and updated information to the remote monitoring station 722.

The present invention ensures that handlers are not guessing at load strength and balance but are confident that each load is secure, balanced and that the overall composite weight is not beyond maximum allowable levels. Any significant shifts in the load, additions to the load or deletions from the load indicating tampering, will preferably trigger alarms. An alarming event will be triggered when a smart e-strap unit senses changes which indicate abnormal or unacceptable conditions.

A prerecorded message may be provided to alert the remote monitoring station of abnormal conditions and trigger an inspection alert for a specific container. Further, the smart e-strap unit may automatically alert the receiving facilities and transfer all related data. Preferably, this data may include load weight, load dimensions, number of packages, location, date, time and altitude of the event as well as the pressure, forces, and compression levels pertinent to the container which may aid in the rapid inspection of the compromised load. Also preferably, after the inspection is complete, handlers will reset the monitoring devices and report findings.

While the above descriptions regarding the present invention contain much specificity, these should not be construed as limitations on the scope, but rather as examples. Many other variations are possible. Accordingly, the scope should be determined not by the embodiments illustrated, but by the appended claims and their legal equivalents.

What is claimed is:

1. A method for monitoring, balancing, and maintaining a balanced tension within different sections of a securing mechanism; the method comprising:
    loading a container;
    attaching a monitoring device to at least one load securing mechanism;
    imputing specifications pertaining to the container
    detecting and reading stored embedded data pertaining to the container;
    configuring at least one sensor based on the container specifications;
    measuring the tension of at least one section of the load securing mechanism;
    balancing the tension for at least one section of the load securing mechanism based on the detected measurements; and
    transmitting sensor data to a remote monitoring station for back end analysis.

2. The method of claim 1, wherein the load securing mechanism is selected form the following group of load securing mechanisms: tie downs, straps, net pallet couplers, shoring, tie down equipment, ratchets, cam buckles, flat hooks, flat snap hooks, grab hooks, winches, or load bars.

3. The method of claim 2, wherein the method further comprises transmitting the load data from at least one subordinate monitoring device to a central monitoring device serving as a hub.

4. The method of claim 3, wherein the central monitoring device is configured to establish a star network and act as the hub and further wherein is configured to collect and compile data from at least one subordinate monitoring device attached to at least one section of the load securing mechanism.

5. The method of claim 4, wherein the central monitoring device is further configured to establish a mesh network of central monitoring devices, wherein at least one central monitoring device is designated as a hub to collect, compile, and transmit data from at least one other star network of monitoring devices attached to the load securing mechanisms.

6. An apparatus for monitoring, balancing, and maintaining a balanced tension within different sections of a load securing mechanism, wherein the apparatus is configured to attach to at least one securing mechanism for monitoring the conditions of load balance, tension, and weight of a cargo load, the apparatus comprising:
    an interface element for receiving information about the cargo load;
    a monitoring element attached to at least one load securing mechanism;
    at least one sensing element for reading stored embedded data;
    at least one measuring element for measuring the tension of each section of the load securing mechanism;
    a balancing element for adjusting the tension for each section of the load securing mechanism based on the data collected by at least one measuring element;
    at least one sensor;
    a transceiver element, wherein the transceiver element is configured to transmit and receive data to and from a remote monitoring station; and
    a processing element, wherein the processing element is configured to receive and implement data from a remote monitoring station, user input, or at least one sensor.

7. The apparatus of claim 6, wherein the apparatus further comprises an arming unit for detecting tampering and creating an alarm event based tampering.

8. The apparatus of claim 7, wherein at least one of the sensors for measuring the tension of each section of the load securing mechanism is a fabric bend sensor.

9. The apparatus of claim 8, wherein the apparatus is further configured to determine the weight of the load.

10. The apparatus of claim 9, wherein the load is selected from the following types of loads: unit load devices, pallets or shipping container.

11. The apparatus of claim 10, wherein at least one of the sensors is selected from the following group of sensors: compact compression load sensor, stress sensor, tension indicator, fabric bend sensor or air pressure sensor.

12. The apparatus of claim 11, wherein the monitoring device is configured to attach to a securing mechanism selected from the following group of secure mechanisms: tie downs, straps, net pallet couplers, shoring, tie down equipment, ratchets, cam buckles, flat hooks, flat snap hooks, grab hooks, winches, or load bars.

* * * * *